May 22, 1956 F. L. ORR 2,746,229
LAWN EDGER
Filed Feb. 12, 1953 2 Sheets-Sheet 1
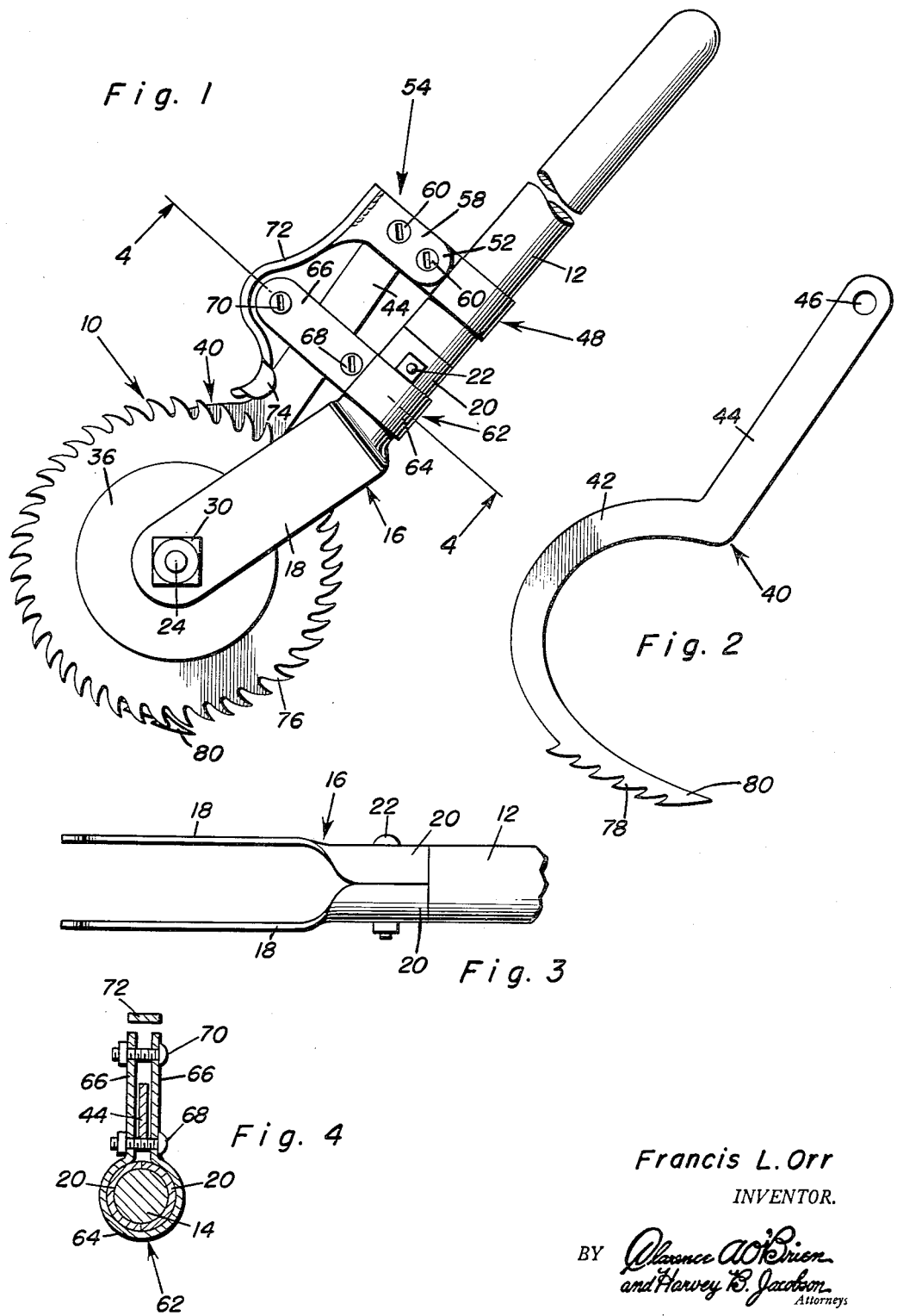
Francis L. Orr
INVENTOR.

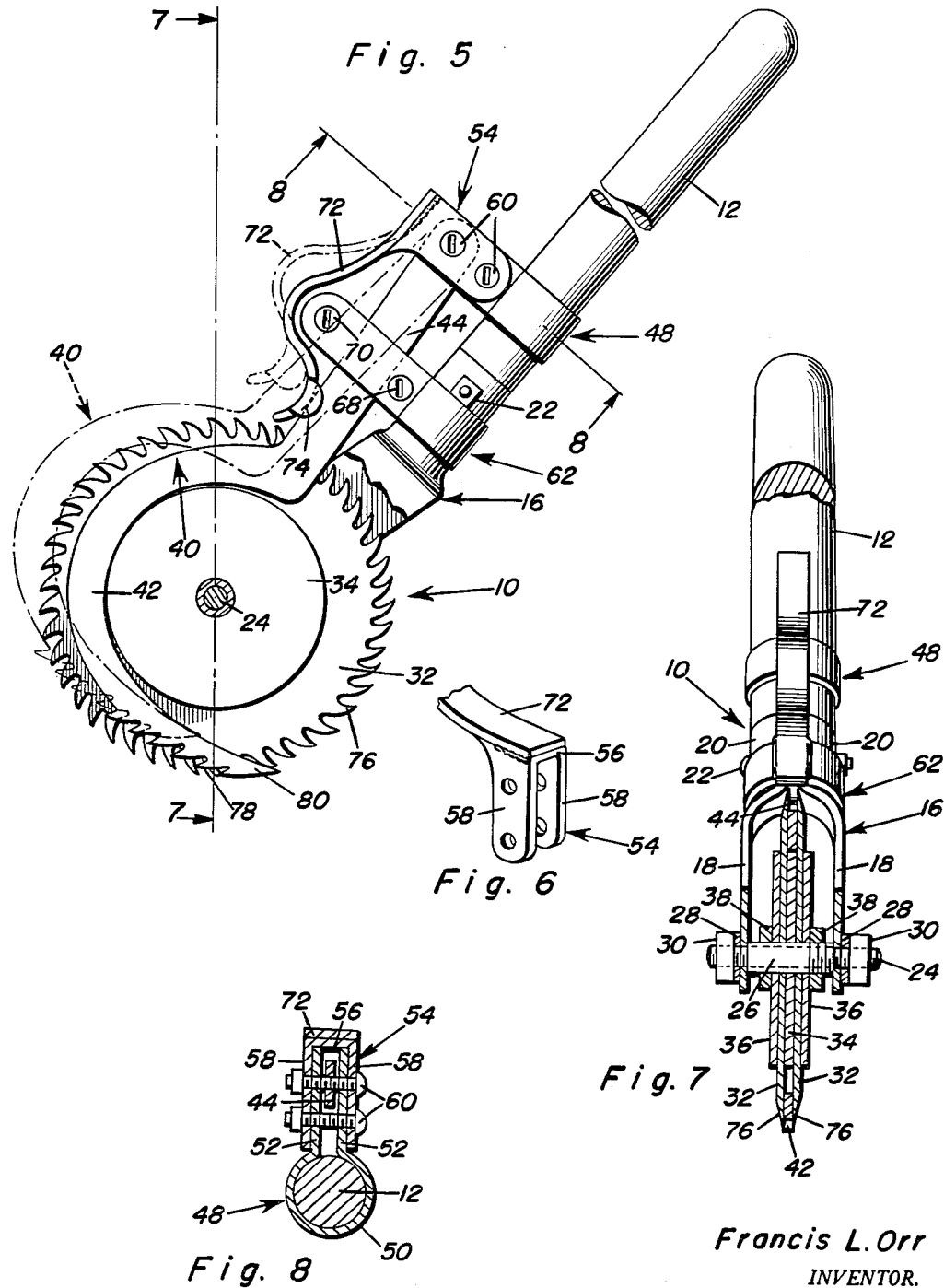

United States Patent Office 2,746,229
Patented May 22, 1956

2,746,229

LAWN EDGER

Francis L. Orr, Sacramento, Calif.

Application February 12, 1953, Serial No. 336,510

4 Claims. (Cl. 56—256)

This invention relates in general to grass cutting implements, and more specifically to an improved lawn edger.

It is the primary object of this invention to provide an improved lawn edger which may be conveniently moved along an edge of a lawn for cutting stray grass therealong.

Another object of this invention is to provide an improved lawn edger which includes a pair of rotatable ground engaging cutters which are movable relative to a relatively fixed cutter so as to greatly facilitate the cutting of stray grass at edges of lawns.

Another object of this invention is to provide an improved lawn edger which is of a relatively simple construction and which is highly efficient, said lawn edger being formed of readily obtainable materials whereby the same is economically feasible.

A further object of this invention is to provide an improved lawn edger which includes means for efficiently cutting grass at edges of lawns and which is provided with means for conveniently removing grass from cutters thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the improved lawn edger, which is the subject of this invention, and shows the general appearance of the same, an intermediate portion of a handle thereof being omitted;

Figure 2 is a side elevational view of a relatively fixed cutter of the lawn edger;

Figure 3 is a rotated fragmentary elevational view of the lower end of the handle of the lawn edger and a mounting bracket carried by the same, the cutters and their associated mounting means being omitted;

Figure 4 is a transverse vertical sectional view taken substantially upon the plane indicated by the section line 4—4 of Figure 1 and shows the general construction of a guide member for the relatively fixed cutter;

Figure 5 is a side elevational view similar to Figure 1 with a portion of the mounting bracket and one of the rotatable cutters being omitted in order to clearly show the relationship of the relatively fixed cutter with respect to the rotatable cutters, a grass removing position of the relatively fixed cutter being shown in dotted lines;

Figure 6 is a rotated fragmentary perspective view of one end of a combined mounting bracket and spring member for the relatively fixed cutter;

Figure 7 is a vertical sectional view taken substantially upon the plane indicated by the section line 7—7 of Figure 5 and shows the specific relationship of the rotatable cutters and the relatively fixed cutter, also shown is the manner in which the rotatable cutters are mounted for rotation; and Figure 8 is a transverse sectional view taken substantially upon the plane indicated by the section line 8—8 of Figure 5 and shows the manner in which the relatively fixed cutter is mounted.

Referring now to the drawings in detail, it will be seen that the lawn edger, which is the subject of this invention, is referred to in general by the reference numeral 10. The lawn edger 10 includes an elongated handle 12 which is provided with a reduced lower end portion 14. Secured to the lower end of the handle 12 and projecting downwardly and forwardly therefrom is a bifurcated mounting bracket which is referred to in general by the reference numeral 16. The mounting bracket 16 is formed in two halves, each of which includes a leg 18 and an upper semi-circular clamping portion 20. The two clamping portions 20 surround the reduced lower end portion 14 of the handle 12 and are removably secured thereto by a suitable fastener 22.

Referring now to Figure 7 in particular, it will be seen that extending between and passing through the lower ends of the legs 18 is an axle-forming shaft 24. Carried by the axle 24 and disposed between the legs 18 is an externally threaded sleeve 26. The axle 24 is retained in position by adjustable lock means 28 and 30 disposed on opposite sides of the legs 18.

It will be understood that the sleeve 26 is rotatable with respect to the axle 24. Mounted on the sleeve 26 for rotation therewith is a pair of circular cutters 32 or cutting wheels which are disposed in spaced parallel relation, the cutters being retained in spaced relation by an enlarged centrally disposed spacer 34. Abutting the outer faces of the cutters 32 are outer spacers 36 which are clamped against the cutters 32 by adjustable retaining members 38 adjustably carried by the sleeve 26.

Referring now to Figure 2 in particular, it will be seen that there is illustrated a relatively fixed cutter or floating blade or shearing and cleaning blade which is referred to in general by the reference numeral 40. The cutter 40 is generally sickle-shaped in outline and includes an arcuate lower portion 42 and an elongated leg portion 44. The leg portion 44 is provided at its upper end with a bore 46 whose purpose will be explained in more detail hereinafter.

Referring now to Figures 1 and 8 in particular, it will be seen that carried by the handle 12 adjacent the lower end 14 thereof is a split clamp which is referred to in general by the reference numeral 48. The split clamp 48 includes a generally cylindrical portion 50 which receives the handle 12 and a pair of spaced parallel arms 52. The arms 52 extend upwardly and forwardly from the handle 12 and have secured thereto a bracket which is referred to in general by the reference numeral 54.

The bracket 54 is channel-shaped in cross-section and includes a web 56 and a pair of depending legs 58. The legs 58 are in telescoped relation relative to the arms 52 and secured thereto by a pair of spaced fasteners 60. The fasteners 60 result in the urging of the arms 52 towards each other to cause clamping of the handle 12 by the clamp 48.

Disposed between the arms 52 is the upper end of the leg portion 44 of the relatively fixed cutter 40. The upper fastener 60 or pivot pin is received through the bore 46 so as to mount the relatively fixed cutter 40 for limited pivotal movement.

Referring now to Figures 1 and 4 in particular, it will be seen that secured to the lower end of the handle 12 and clampingly engaging the clamping portions 20 of the mounting bracket 16 is a second clamp which is referred to in general by the reference numeral 62. The clamp 62 includes a generally cylindrical portion 64 which substantially surrounds the clamping portions 20. The clamp 62 also includes a pair of upwardly and forwardly directed arms 66 which are in spaced parallel relation. The arms 66 have passing therethrough adjacent the cylindrical portion 64 a lower fastener 68 which results in the clamping action of the cylindrical portion 64. The arms 66 are also connected together by an upper fastener 70.

It will be noted that the leg portion 44 of the relatively fixed cutter 40 is disposed between the arms 66 and that pivotal movement thereof is limited by the fasteners 68 and 70 or limit stops. Accordingly, the clamp 62 may be considered to be a guide member for the relatively fixed cutter 40.

In order that the relatively fixed cutter 40 may be retained in a first or lowermost cooperating relation with the rotatable cutters 32, the fitting 54 has secured to the web portion 56 thereof an upper end of a spring member 72. The spring member 72 is generally S-shaped in outline and is disposed in overlying relation relative to the leg portion 44 of the relatively fixed member 40. The lower end of the spring member 72 engages the lower part of the leg portion 44 and is retained in engagement therewith by a pair of depending ears 74. It will also be noted that the spring member 72 clears the arms 66 of the clamp 62 in a manner best illustrated in Figure 5.

Due to the resilient urging of the spring member 72, the relatively fixed cutter 40 is urged downwardly and rearwardly into engagement with the centrally located spacer 34 which also functions as a stop member or limit stop for the relatively fixed cutter 40.

It will be noted that the rotatable cutters 32 are provided with peripheral teeth 76 which taper outwardly in thickness in the manner best illustrated in Figure 7. The lower end of the arcuate portion 42 of the relatively fixed cutter 40 is also provided with teeth 78. The teeth 78 are of a constant thickness and face in a direction opposite from the teeth 76 for cooperation therewith.

When the lawn edger 10 is being utilized, the same is moved forwardly along an edge of a lawn with the rotatable cutters 32 engaging the ground and rotated accordingly by the forward movement of the mounting bracket 16 and the handle 12. Inasmuch as the teeth 78 of the relatively fixed cutter 40 are disposed in alignment with and between the rotating teeth 76 of the rotatable cutters 32, it will be seen that grass disposed within the path of the rotating teeth 76 will be moved between the rotating teeth and the fixed teeth 78 to result in the shearing of the same.

During a lawn edging operation, the teeth 32, in addition to the space between the teeth 32, have a tendency to become clogged with grass which has been cut. In order that the teeth and the space therebetween may be periodically cleaned, the extreme lower end of the relatively fixed cutter 40 is provided with a point 80. When the lawn edger 10 is moved rearwardly, the point 80 digs into the ground and the relatively fixed cutter 40 will move forwardly against the resistance of the spring member 72 to the position best illustrated in Figure 5. The forward movement of the relatively fixed cutter 40 with respect to the rotatable cutters 32 results in the cleaning of the grass from the teeth 76 and therebetween.

In certain environments of use and types of lawn it has been found that a very satisfactory result is obtained by weakening the spring member 72 and proportioning the thickness of the arcuate member 42 so that it will be in at least light frictional contact with the adjacent inner sides of the cutting wheels, and as appears most clearly in Figure 7. Owing to this frictional engagement and the location of the upper fastener 60 or pivot pin, forward rotation of the cutting wheels causes the interposed sickle-shaped or arcuate member to be frictionally urged downwardly and inwardly to approximately the position shown in Figure 5. Where, on the other hand, the cutting wheels are rotated in the reverse, or rearward, direction, the frictional forces exerted by the inner sides of the cutting wheels on the contiguous sides of the arcuate member in conjunction with the force exerted by the point 80 urges the arcuate member outwardly and upwardly to the approximate position shown in outline in Figure 5. This outward motion is effective to dislodge any particles, such as twigs, stones, and clumps of dirt and grass, which have clogged the cutting wheels. Thus an occasional reversal of the wheels serves quickly, easily and efficiently to clean the edger.

In view of the foregoing, it will be seen that there is provided a relatively simply constructed lawn edger which, through the provision of a pair of rotatable cutters and a centrally located fixed cutter, has the cutting effect of four blades. Therefore, the lawn edger 10 is a highly efficient grass cutting implement. Also, inasmuch as the lawn edger 10 is self-cleaning through a short backward stroke, the lawn edger may be conveniently retained in its most efficient grass cutting condition.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A lawn edger comprising a portable support, a pair of ground-engaging cutting wheels rotatably mounted on one end of said support, said wheels being spaced apart a predetermined distance, a mounting bracket on said support, a guide bracket on said support, a pair of spaced limit stops on said guide bracket, and a floating blade pivotally mounted on said mounting bracket and extending through said guide bracket between said limit stops to a location between said cutting wheels, the thickness of said floating blade being substantially equal to said predetermined distance between said cutting wheels whereby rotational movement of said cutting wheels in one direction urges said floating blade toward one of said limit stops and in the other direction toward the other of said limit stops.

2. A lawn edger comprising a longitudinal portable support; a bilaterally symmetrical lawn cutter including a pair of spaced ground-engaging cutting and supporting wheels mounted on said support to rotate about an axis normal to the axis of said support, and a spacer disposed between said cutting wheels and rotatable therewith in a plane inclusive of the longitudinal axis of said support; a sickle-shaped member pivotally mounted on said support, said member comprising an arcuate-shaped lower portion having a thickness substantially equal to the thickness of said spacer and being in frictional contact with said cutting wheels and movable from a position adjacent said spacer to a position adjacent the peripheries of said cutting wheels in response to one direction of rotation of said cutter and from a position adjacent said peripheries to a position adjacent said spacer in response to the other direction of rotation of said cutter; and a limit stop mounted on said support for abutment with said sickle-shaped member in said position of said lower portion adjacent said cutting wheel peripheries.

3. A lawn edger comprising a longitudinal portable support; a pair of spaced cutting wheels mounted on said support to rotate about an axis normal to the longitudinal axis of said support, each of said wheels having around the peripheries thereof a plurality of hooked teeth inclined in one direction with respect to a radius line of said wheels to engage lawn particles; a spacer separating said cutting wheels and maintaining said wheels in predetermined parallel spaced relation; and a shearing and cleaning blade rockably mounted on said support, said blade including an arcuate-shaped member interposed between said cutting wheels and in frictional engagement therewith, said arcuate-shaped member having adjacent its free end and on the leading edge thereof a plurality of hooked teeth inclining in a direction opposed to the direction of said cutting wheel teeth adjacent thereto for shearing lawn particles engaged with said teeth, said arcuate-shaped member being frictionally urged by said wheels in a downward and lawn engaging direction in a forward progression of said wheels, and in an upward and lawn disengaging direction in a rearward progression of said wheels, said arcuate-shaped member being effective in said upward direction of motion to dislodge lawn particles spanning said cutting wheels in a location adjacent to and outwardly from said arcuate-shaped member.

4. A lawn edger comprising a handle, a mounting bracket carried at a lower end of said handle, a rotatable cutter rotatably carried by said bracket, said cutter including a pair of symmetrically disposed cutting wheels having an equal diameter, said wheels having hooked teeth to urge lawn particles in a rearward direction with respect to said bracket as said handle and said bracket are moved in a forward direction, a relatively fixed cutter pivotally mounted on said bracket and extending into a position between said cutting wheels, said relatively fixed cutter being swingable from a first position of cooperating shearing relation with said cutting wheels to a second position of cooperating shearing relation with said cutting wheels, the motion of said relatively fixed cutter from said first position to said second position being effective to dislodge lawn particles adjacent the leading edge of said relatively fixed cutter, and means mounted on said bracket for limiting the swing of said relatively fixed cutter.

References Cited in the file of this patent

UNITED STATES PATENTS

| | | |
|---|---|---|
| 773,095 | Olson | Oct. 25, 1904 |
| 2,484,276 | Eberhart | Oct. 11, 1949 |
| 2,626,499 | Wick | Jan. 27, 1953 |